United States Patent
Fujimoto et al.

(10) Patent No.: US 7,219,554 B2
(45) Date of Patent: May 22, 2007

(54) SEMICONDUCTOR PRESSURE SENSOR

(75) Inventors: Seizo Fujimoto, Tokyo (JP); Takafumi Hara, Tokyo (JP); Masaaki Taruya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/225,019

(22) Filed: Sep. 14, 2005

(65) Prior Publication Data

US 2006/0278012 A1    Dec. 14, 2006

(30) Foreign Application Priority Data

May 30, 2005   (JP)   ............... 2005-157154

(51) Int. Cl.
*G01L 9/00*   (2006.01)
(52) U.S. Cl. ............... 73/754; 73/722; 257/419
(58) Field of Classification Search ............ 73/754, 73/727, 721, 722; 257/419
See application file for complete search history.

(56) References Cited

U.S. PATENT DOCUMENTS

| | | | | |
|---|---|---|---|---|
| 5,668,033 A | * | 9/1997 | Ohara et al. | 438/113 |
| 6,229,190 B1 | * | 5/2001 | Bryzek et al. | 257/419 |
| 6,578,426 B2 | * | 6/2003 | Imai et al. | 73/720 |
| 6,877,383 B2 | * | 4/2005 | Horie et al. | 73/754 |
| 2002/0078755 A1 | * | 6/2002 | Imai et al. | 73/717 |
| 2003/0019299 A1 | * | 1/2003 | Horie et al. | 73/718 |

FOREIGN PATENT DOCUMENTS

JP    11-281509 B2    10/1999

* cited by examiner

*Primary Examiner*—Andre J. Allen
(74) *Attorney, Agent, or Firm*—Sughrue Mion, PLLC

(57) ABSTRACT

A semiconductor pressure sensor is not influenced by a charged object in a fluid to be measured or an electric field from the outside, so satisfactory sensitivity and accuracy can be ensured. The semiconductor pressure sensor is provided with a diaphragm 4 that responds to the pressure of the fluid to be measured. The diaphragm includes a silicon substrate with piezoresistive elements, which together constitute a bridge circuit, being embedded therein, and a shield film for electromagnetic shielding formed on a surface of the silicon substrate at a side thereof at which the fluid to be measured is in contact with the silicon substrate. The shield film is electrically connected to the silicon substrate so as to have the same potential as that of the silicon substrate.

6 Claims, 3 Drawing Sheets

| SHIELD FILM THICKNESS | SENSITIVITY CHANGE RATE |
|---|---|
| 1/30 | 80 |
| 1/35 | 85 |
| 1/40 | 91 |
| 1/45 | 95 |
| 1/50 | 100 |

SEMICONDUCTOR PRESSURE SENSOR

BACKGROUND OF THE INVENTION

1. Field of the Invention

The present invention relates to a semiconductor pressure sensor equipped with a diaphragm that is moved in response to the pressure of a fluid to be measured for detecting a pressure such as, for example, the pressure in an intake manifold of an internal combustion engine, the internal pressure of a tank, etc.

2. Description of the Related Art

In the past, there has been known a semiconductor pressure sensor that has a diaphragm formed on one surface of a silicon substrate with a piezoresistive element formed on the diaphragm.

In this case, the diaphragm is caused to distort under the pressure of a fluid to be measured to change the resistance value of the piezoresistive element, whereby the pressure of the fluid to be measured can be detected by outputting an amount of change in the resistance value as an electric signal.

However, the fluid to be measured, which is an object for pressure measurement, generally has an electric charge whether it is a gas or a liquid, so when the fluid to be measured comes into contact with the diaphragm upon measurement of the pressure, the charged object is placed into contact with the diaphragm, too, whereby the resistance value of the piezoresistive element is caused to change under the influence of an electric field generated from this charged object, thus making an electric signal output from the piezoresistive element unstable.

To cope with such a problem, there has been known a semiconductor pressure sensor equipped with a diaphragm whose surface is covered with an insulating film (see a first patent document: Japanese patent application laid-open No. S63-250865 (FIG. 13)).

In this case, a distance between a piezoresistive element and a charged object is increased by the formation of the insulating film, whereby the influence on the piezoresistive element due to an electric field generated from the charged object can be reduced.

In addition, as another measure to deal with the above problem, there has also been known a semiconductor pressure sensor equipped with a diaphragm whose surface is covered with a grounded shield film (see a second patent document: Japanese patent application laid-open No. H11-281509 (FIG. 7)).

In this case, if electric charge is attached to the surface of the shield film on the diaphragm, the electric charge flows out to the outside due to the grounding of the shield film, so that the influence of an electric field from the charged object on the piezoresistive element can be prevented.

However, the above-mentioned first patent document involves the following problem. That is, in order to suppress the influence of the electric field due to the charged object to a low level, it is necessary to increase the thickness of the insulating film thereby to enlarge the distance between the piezoresistive element and the charged object. This increases the thickness of the diaphragm itself, so the amount of displacement of the diaphragm, which is caused to displace in accordance with the pressure of the fluid to be measured, becomes small, thus resulting in that a satisfactory level of sensitivity can not be obtained.

Also, in the case of the above-mentioned second patent document, there is the following problem. That is, when the silicon substrate has a reference potential, an electric field is necessarily generated between the shield film, which is zero potential, and the silicon substrate due to a potential difference therebetween, so the piezoresistive element is always subject to the electric field irrespective of the presence or absence of the charged object, as a result of which if the reference potential varies, the electric signal output from the piezoresistive element will also vary in accordance with the reference potential variation, thus making measured values unstable.

SUMMARY OF THE INVENTION

The present invention is intended to solve the problems as referred to above, and has for its object to provide a semiconductor pressure sensor which is capable of measuring the pressure of a fluid to be measured without being influenced from a charged object in the fluid to be measured as well as an electric field from the outside.

Bearing the above object in mind, according to the present invention, there is provided a semiconductor pressure sensor having a diaphragm that is adapted to move in response to the pressure of a fluid to be measured, the diaphragm including: a silicon substrate with piezoresistive elements, which together constitute a bridge circuit, being embedded therein; and a shield film for electromagnetic shielding formed on a surface of the silicon substrate at a side thereof at which the fluid to be measured is in contact with the silicon substrate. The shield film is electrically connected to the silicon substrate so as to have the same potential as that of the silicon substrate.

According to the semiconductor pressure sensor of the present invention, it is possible to measure the pressure of the fluid to be measured in an accurate manner without being subject to the influence of a charged object in the fluid to be measured as well as an electric field from the outside.

The above and other objects, features and advantages of the present invention will become more readily apparent to those skilled in the art from the following detailed description of a preferred embodiment of the present invention taken in conjunction with the accompanying drawings.

DESCRIPTION OF THE PREFERRED EMBODIMENT

Now, a preferred embodiment of the present invention will be described below in detail while referring to the accompanying drawings.

Embodiment 1.

Figure 1:
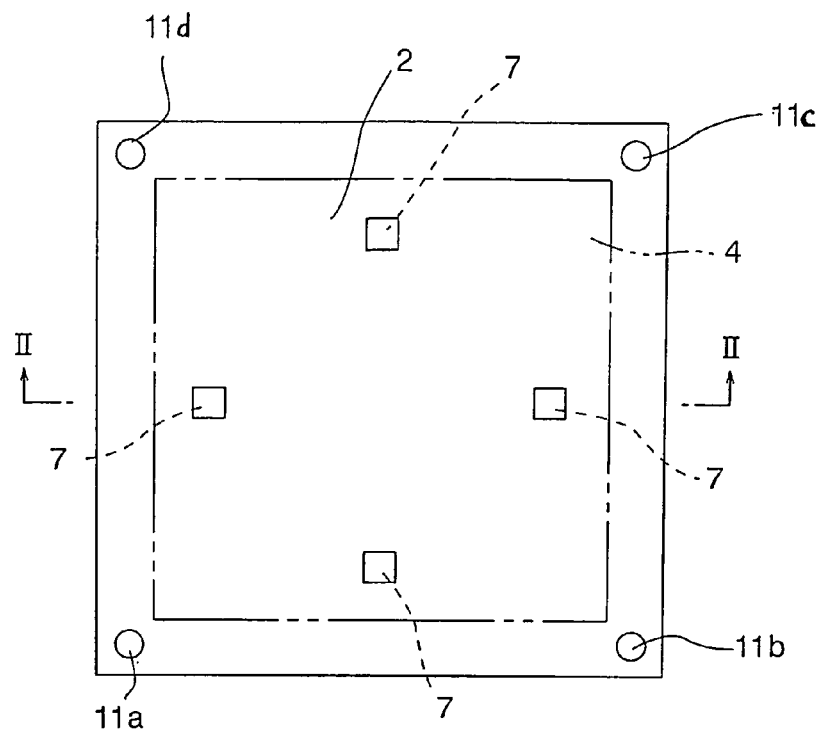
FIG. 1 is a cross sectional view showing a semiconductor pressure sensor according to a first embodiment of the present invention.
Figure 2:
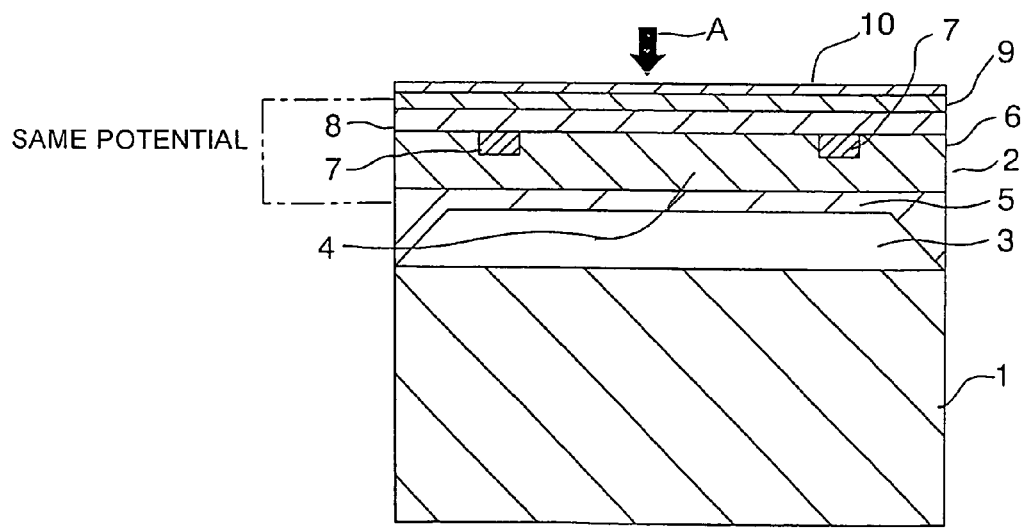
FIG. 2 is a cross sectional arrow view along line II—II of FIG. 1.

FIG. 1 is a cross sectional view that shows a semiconductor pressure sensor according to a first embodiment of the present invention, and FIG. 2 is a cross sectional arrow view along line II—II of FIG. 1.

In this semiconductor pressure sensor, a vacuum chamber or cavity 3 is formed between a glass substrate 1 and a sensor chip 2. The sensor chip 2 includes a diaphragm 4 which is adapted to be deformed in accordance with the pressure of a fluid to be measured, and a plurality of (e.g., four in the illustrated example) pressure sensitive elements in the form of piezoresistive elements 7 formed through diffusion on the diaphragm 4. The four piezoresistive elements 7 are electrically connected with one another to constitute a Wheatstone bridge circuit. On a surface of the silicon substrate 6 at its side near the vacuum chamber 3, there is formed a reference potential film 5 that serves to apply a voltage to the Wheatstone bridge circuit. An insulating or dielectric oxide film 8 is formed on a surface of the silicon substrate 6 at its side remote from the vacuum chamber 3. A shield film 9 of an electromagnetic shielding property made of polysilicon is formed on a surface of the oxide film 8 at its side remote from the piezoresistive element 7. On a surface of the shield film 9 at its side remote from the oxide film 8, there is formed a nitride film 10 that serves as a protective film to protect the surface of the shield film 9 from the fluid to be measured.

A plurality of pads in the form of aluminum pads 11a, 11b, 11c, 11d, with which gold wires (not shown) are connected, respectively, are arranged at four corners of the sensor chip 2. A reference potential is applied directly from an unillustrated power supply IC to the aluminum pad 11a, and the shield film 9 is connected directly with the aluminum pad 11a, so that the reference potential is applied to the reference potential film 5 through the aluminum pad 11a.

The aluminum pads 11b, 11c are connected to the Wheatstone bridge circuit through diffusion wiring, and the aluminum pad 11d is connected to a ground (GND) terminal of the above-mentioned unillustrated power supply IC.

In the semiconductor pressure sensor as constructed above, the pressure of the fluid to be measured is applied from the direction of arrow A to the diaphragm 4 in FIG. 2, whereby the diaphragm 4 is caused to strain deformed. As a result, stress is applied to the piezoresistive element 7, and the resistance value of the piezoresistive element 7 changes in proportion to the magnitude of the stress.

On the other hand, the piezoresistive element 7 constitutes the Wheatstone bridge circuit, to which the reference potential is applied from the outside through the aluminum pads 11a, 11d, as a result of which the output voltage from the Wheatstone bridge circuit changes in accordance with a change in the resistance value of the piezoresistive element 7.

Since the Wheatstone bridge circuit is connected to the aluminum pads 11b, 11c through diffusion wiring (not shown), the amount of change in the output voltage of the Wheatstone bridge is output to the outside through the aluminum pads 11b, 11c, whereby the pressure of the fluid to be measured is detected.

According to the semiconductor pressure sensor as constructed above, the shield film 9 and the reference potential film 5 are electrically connected to each other and have the same potential, so no electric field is generated between the shield film 9 and the reference potential film 5. Accordingly, even when a charged matter or object contained in the fluid to be measured is attached to the diaphragm 4 at the time of pressure measurement, for example, the piezoresistive element 7 sandwiched between the shield film 9 and the reference potential film 5 does not receive any influence from the electric field.

In addition, even if the reference potential of the reference potential film 5 varies, the shield film 9 and the reference potential film 5 remain electrically connected to each other and still have the same potential, so in this case, too, the piezoresistive element 7 does not influenced by the electric field.

Moreover, since the piezoresistive element 7 is placed between the shield film 9 and the reference potential film 5 of the same potential, it is not essential to escape the external charge to the GND terminal of the above-mentioned unillustrated power supply IC through the shield film 9, and hence, the nitride film 10 can be formed on the surface of the shield film 9 as a protective film for the sensor chip 2.

Since the shield film 9 is connected directly with the aluminum pad 11a, it is unnecessary to provide a new additional step of forming a hole for connection between the reference potential film 5 and the shield film 9 during the process of fabricating the sensor chip 2 on the glass substrate 1, and hence the shield film 9 can be easily made the same potential as that of the reference potential film 5.

On the other hand, the shield film 9 can maintain a predetermined potential as long as it is an electrically conductive film, but it is difficult for the shield film 9, if made of a material such as a metal body or the like which is greatly different in physical properties such as the coefficient of linear expansion, etc., to output a change in the resistance value of the piezoresistive element 7 due to a distortion or strain of the diaphragm in a stable manner. Thus, it is inappropriate to use such a metal material or the like as the shield film of the semiconductor pressure sensor.

For this reason, in this embodiment, as a material for the shield film 9, there is used polysilicon which is similar in physical properties to the silicon substrate 6. When selecting polysilicon, the inventor verified through experiments that polysilicon can maintain the performance of the semiconductor pressure sensor to a satisfactory extent.

Further, since in this embodiment, the shield film 9 is arranged on the diaphragm 4, the diaphragm 4 becomes less prone to being distorted under pressure as compared with a diaphragm unprovided with a shield film. That is, sensitivity tends to decrease with respect to pressure.

Figures 3, 4:
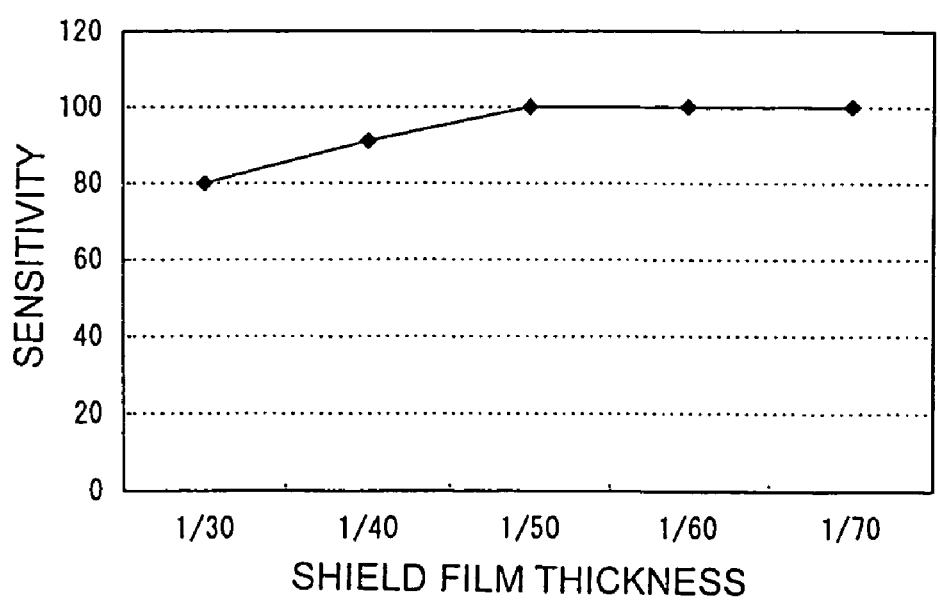
FIG. 3 is a view showing the relation between the thickness and sensitivity of a shield film that was obtained through experiments by the inventor of the subject application.
FIG. 4 is a characteristic view illustrating the relation of FIG. 3 while being plotted.

The inventor examined the relation between the thickness and sensitivity of a shield film through experiments. FIG. 3 is a view showing the relation at that time, and FIG. 4 is a characteristic view illustrating the relation of FIG. 3 while being plotted.

In FIG. 3 and FIG. 4, for example, a shield film thickness of 1/30 indicates the ratio of the thickness of a shield film made of polysilicon with respect to the thickness of an existing diaphragm, i.e., a diaphragm without a shield film formed thereon.

In addition, for example, a sensitivity change rate of 80 indicates that the sensitivity change rate of the diaphragm with the shield film (here, with the nitride film being excluded) is 80 assuming that the above-mentioned existing diaphragm is 100.

From FIG. 3 and FIG. 4, it is found that if the thickness of the shield film is 1/50 or less of the thickness of the existing diaphragm, the sensitivity change rate is 100, and hence the same sensitivity can be obtained as that of the existing diaphragm.

Father, although in this embodiment, the shield film 9 is arranged on the diaphragm 4, such an arrangement can result in that satisfactory electromagnetic shielding performance might not be obtained because of the influence of a potential distribution resulting from the resistance of the shield film 9 itself.

Figure 5:
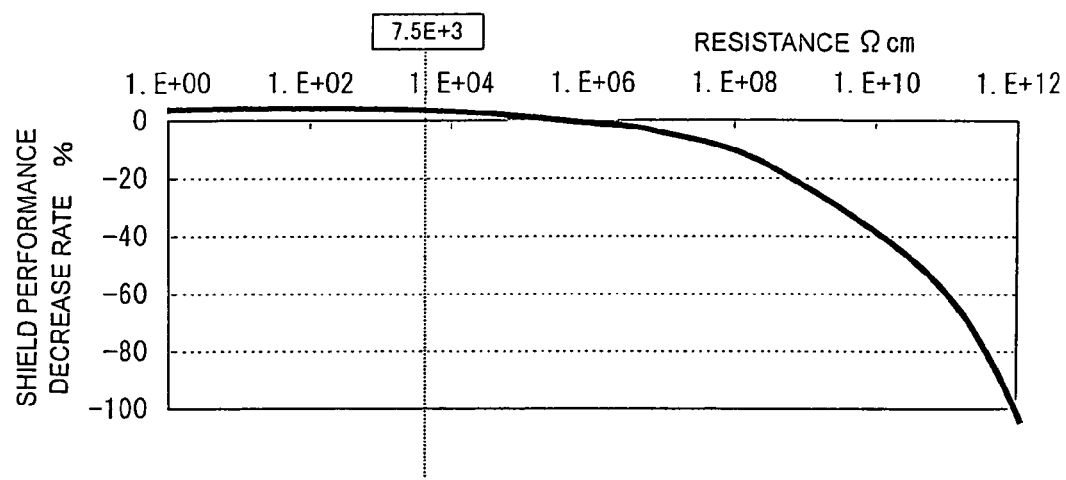
FIG. 5 is a view showing the resistance value of the shield film that was obtained through experiments by the inventor of the subject application.

Also, the inventor examined the relation between the resistance and shielding performance of the shield film through experiments. FIG. 5 is a characteristic view obtained at that time. Here, note that in FIG. 5, for example, "E+02" indicates "$\times 10^2$", and "E+03" indicates "$\times 10^3$".

From FIG. 5, it is found that when the resistivity of the shield film is $7.5 \times 10^3 \Omega \cdot cm$ or less, satisfactory electromagnetic shielding performance is obtained, but when it is $1 \times 10^{12} \Omega \cdot cm$, the electromagnetic shielding performance becomes zero.

Here, note that to set the resistivity of the shield film to be $7.5 \times 10^3 \Omega \cdot cm$ or less can be ensured by doping the shield film with phosphorus.

Although in the above-mentioned embodiment, the reference potential film 5 is formed on the surface of the silicon substrate 6 at its side near the vacuum chamber 3, a semiconductor pressure sensor with such a reference potential film being removed can be obtained by setting the silicon substrate itself to be a reference potential.

While the invention has been described in terms of a preferred embodiment, those skilled in the art will recognize that the invention can be practiced with modifications within the spirit and scope of the appended claims.

What is claimed is:

1. A semiconductor pressure sensor having a diaphragm that is adapted to move in response to the pressure of a fluid to be measured, said diaphragm comprising:
   a silicon substrate with piezoresistive elements, which together constitute a bridge circuit, being embedded therein; and
   a shield film for electromagnetic shielding formed on a surface of said silicon substrate at a side thereof at which said fluid to be measured is in contact with said silicon substrate;
   wherein said shield film is electrically connected to said silicon substrate so as to have the same potential as that of said silicon substrate, and
   wherein a reference potential film, which is electrically connected to said shield film and serves to apply a voltage to said bridge circuit, is formed on a surface of said silicon substrate at a side thereof remote from said shield film.

2. The semiconductor pressure sensor as set forth in claim 1, wherein said shield film is made of polysilicon.

3. The semiconductor pressure sensor as set forth in claim 2, wherein the thickness of said shield film is 1/50 or less of the thickness of said diaphragm excluding said shield film.

4. The semiconductor pressure sensor as set forth in claim 2, wherein the resistivity of said shield film is $7.5 \times 103 \Omega \cdot cm$ or less.

5. The semiconductor pressure sensor as set forth in claim 1, wherein said shield film is directly connected with pads which are electrically connected to said reference potential film for applying a voltage from the outside to said reference potential film.

6. The semiconductor pressure sensor as set forth in claim 1, wherein a protective film for physically protecting a surface of said shield film is formed on the surface of said shield film at a side thereof remote from said silicon substrate.

* * * * *